United States Patent [19]

Heideman et al.

[11] Patent Number: 5,147,017

[45] Date of Patent: Sep. 15, 1992

[54] SHOCK ABSORBER

[75] Inventors: Robert J. Heideman, Westland; Richard T. Mitera, Canton, both of Mich.

[73] Assignee: Enertrols, Inc., Westland, Mich.

[21] Appl. No.: 350,340

[22] Filed: May 8, 1989

[51] Int. Cl.⁵ ............................................. F16F 9/44
[52] U.S. Cl. ................................. 188/287; 188/285; 188/318
[58] Field of Search ............... 188/322.19, 318, 285, 188/286, 287

[56] References Cited

U.S. PATENT DOCUMENTS

| | | | |
|---|---|---|---|
| 3,605,960 | 9/1971 | Singer | 188/318 |
| 3,997,037 | 12/1976 | Schupner | 188/318 X |
| 3,998,302 | 12/1976 | Schupner | 188/285 |
| 4,133,415 | 1/1979 | Dressell, Jr. et al. | 188/285 |
| 4,174,098 | 11/1979 | Baker et al. | 188/285 |
| 4,298,101 | 11/1981 | Dressell, Jr. et al. | 188/285 |
| 4,321,987 | 3/1982 | Dressell, Jr. et al. | 188/285 |
| 4,482,035 | 11/1984 | Heideman et al. | 188/287 |
| 4,660,687 | 4/1987 | Williams et al. | 188/287 |

Primary Examiner—Matthew C. Graham
Attorney, Agent, or Firm—Krass & Young

[57] ABSTRACT

A shock absorber of the linear deceleration type in which the housing includes a forward reduced diameter threaded portion and a fixed flange at the rear end of the housing. This arrangement combines the advantages of the primary type of shock absorber and the fixed flange type of shock absorber and allows the invention shock absorber to be mounted in a wide variety of work situations with the mounting in each situation providing a positive position of the shock absorber relative to the mounting structure so that the shock absorber may be exchanged without fear of losing the precise positioning of the shock absorber relative to the object to be decelerated and with the mounting in each situation allowing the ready provision of a stop member to accurately position the component being stopped and to assure that the shock absorber will not bottom out internally.

4 Claims, 3 Drawing Sheets

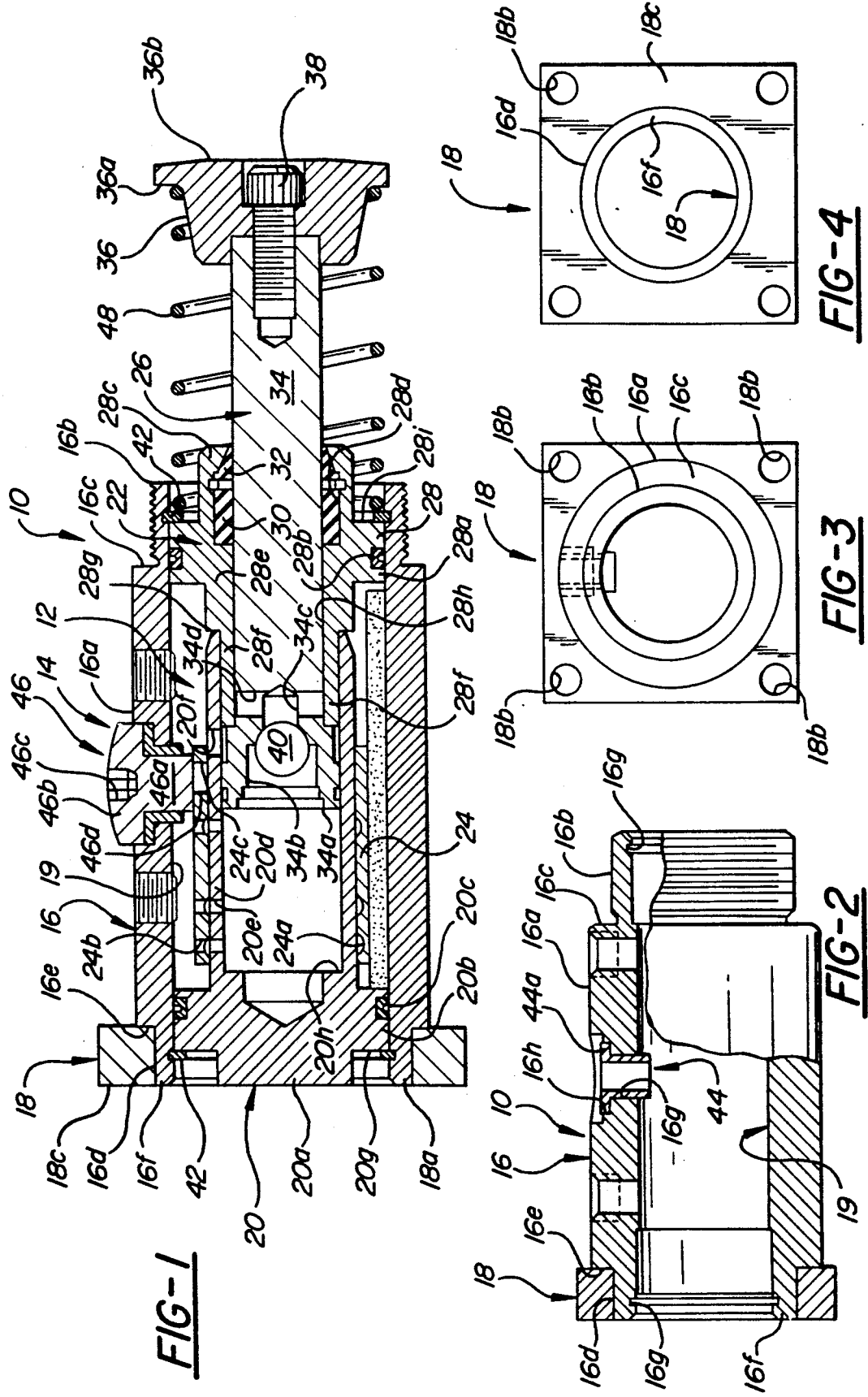

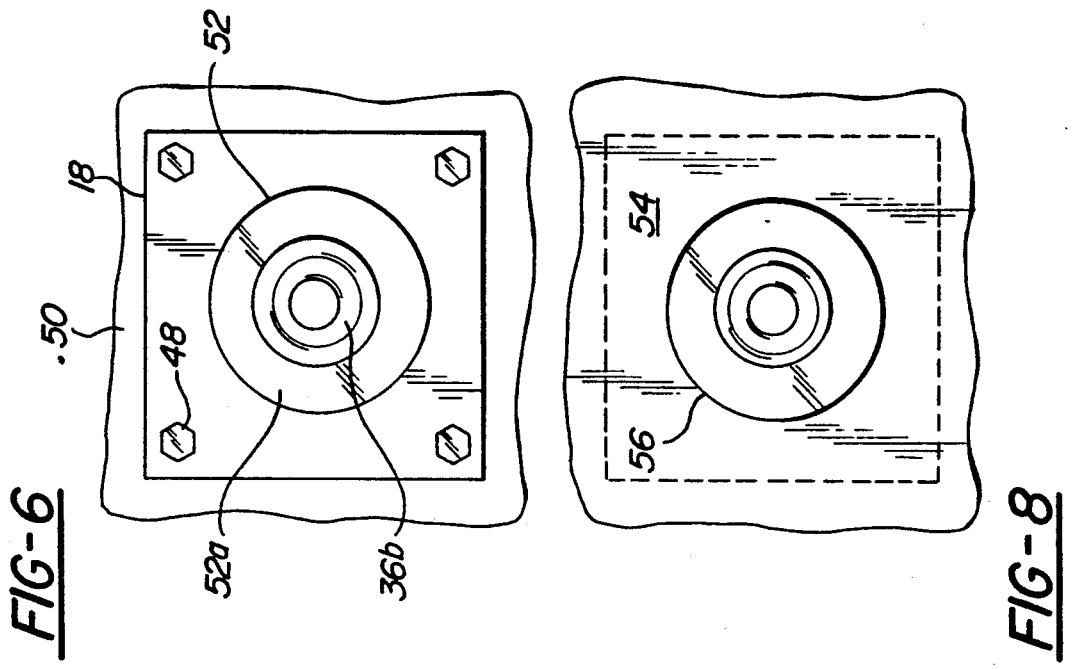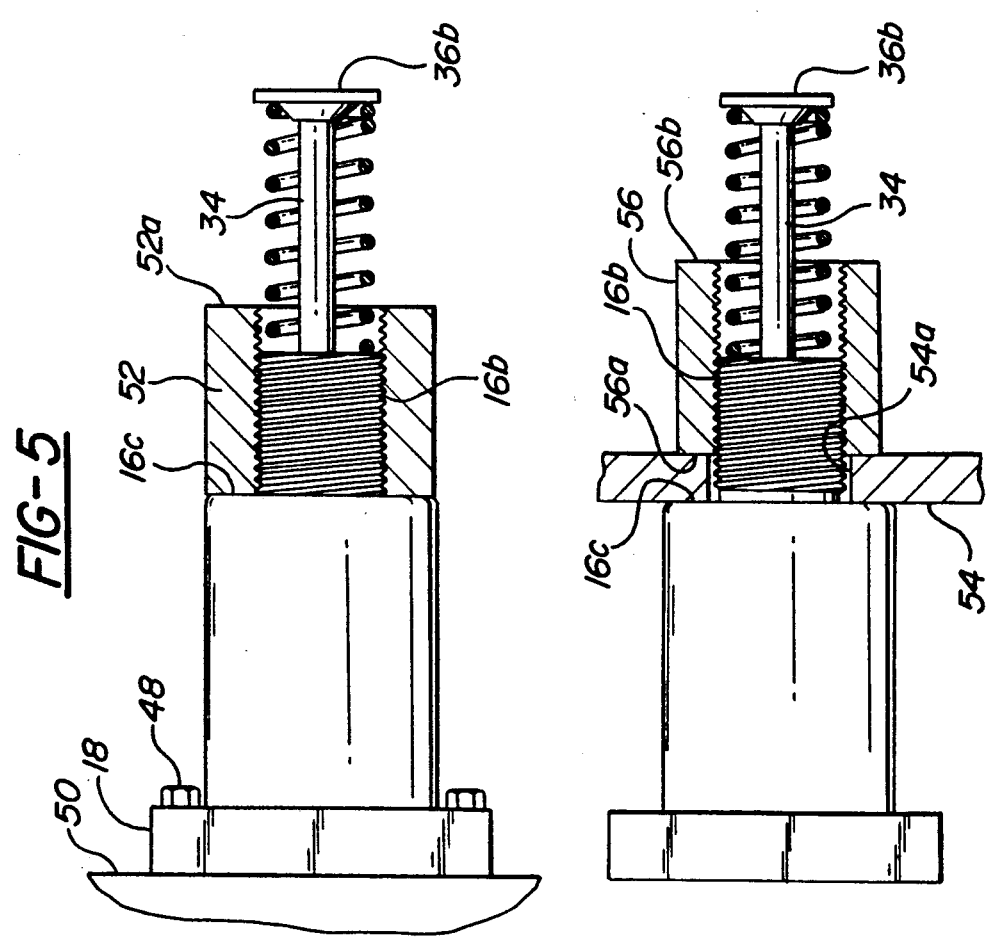

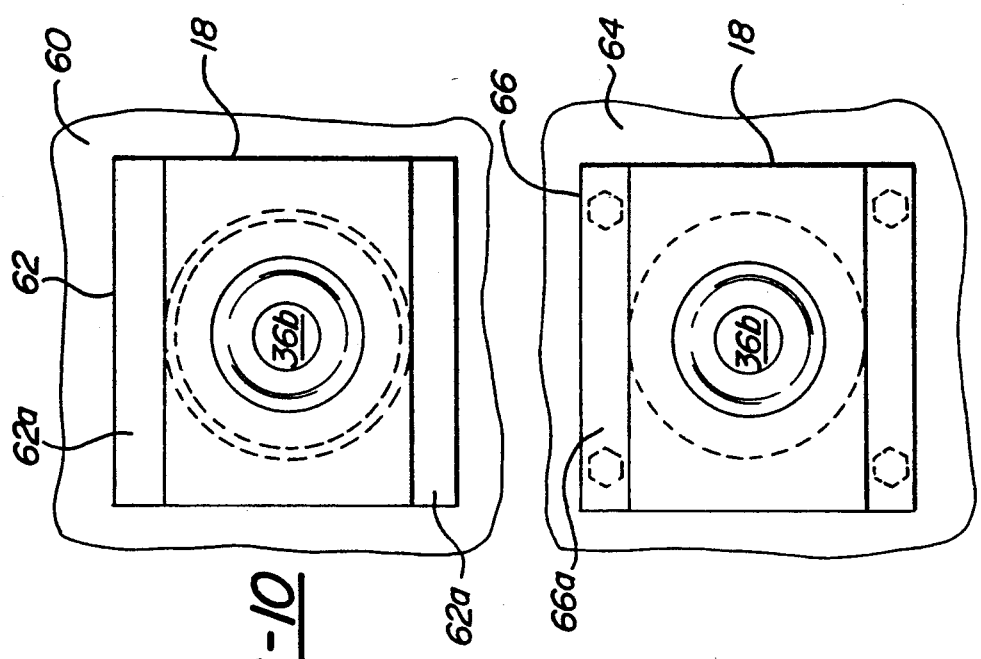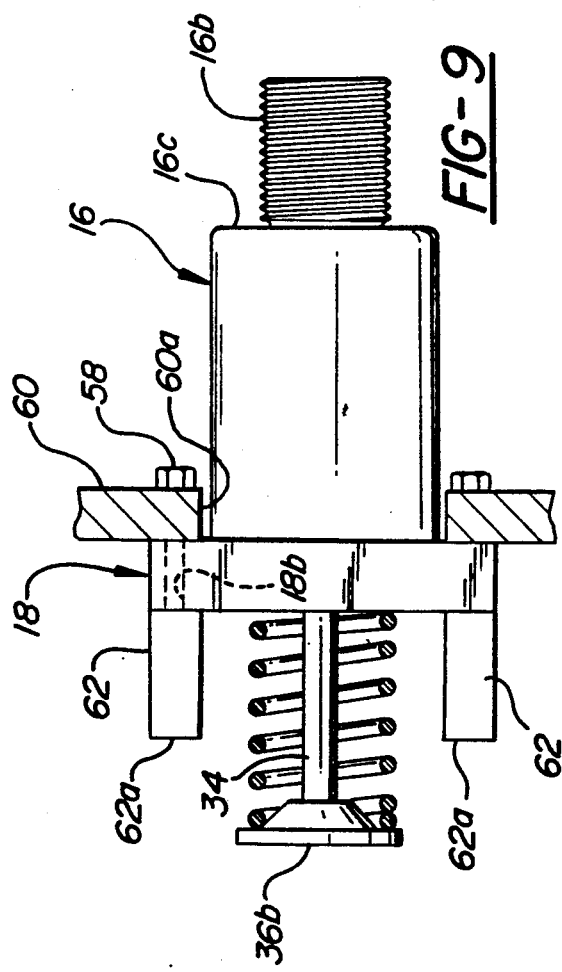

SHOCK ABSORBER

BACKGROUND OF THE INVENTION

This invention relates to a shock absorber device for linearly decelerating a machine part by imposing a relatively constant force on the part over the stroke of the device.

Shock absorbers which force fluid through a restricted orifice to convert the kinetic energy of a moving part into an increase in the thermal energy of the fluid are commonly used on machines. In a typical installation, a machine tool or transfer arm is repetitively moving back and forth between separate operating positions and the movement of the tool or arm as it arrives at each position is cushioned and decelerated by a shock absorber positioned on the tool or arm or on the adjacent supporting structure.

Shock absorbers of this general type are available in several forms. In one form, commonly referred to as a threaded body shock absorber, the housing or body of the shock absorber is threaded throughout its entire length and the shock absorber is typically mounted by threading the body into a supporting plate or bracket. A shock absorber of this general type is shown, for example, in U.S. Pat. No. 4,690,255 assigned to the assignee of the present invention.

In another form of shock absorber, commonly called a fixed flange shock absorber, the housing of the shock absorber includes a cylindrical main body portion and a flange is secured to either the front or rear end of the main body portion. Shock absorbers of this type are typically mounted by the use of mounting screws passing through apertures in the mounting flange to secure the shock absorber to a plate or support structure. Shock absorbers of this general type are shown, for example, in U.S. Pat. Nos. 4,059,175, 4,133,415, 4,298,101, 4,321,987, 4,482,035, and 4,702,355, all assigned to the assignee of the present invention.

In another form of shock absorber, commonly called a primary shock absorber, the shock absorber body comprises a central main body portion and reduced diameter threaded portions at the front and rear ends of the housing. This type of shock absorber is either rear mounted by the sue of the reduced diameter threaded rear portion or front mounted by the use of the reduced diameter threaded front portion. A shock absorber of this general type is shown, for example, in U.S. Pat. No. 4,694,939, assigned to the assignee of the present invention.

Whereas each of the described shock absorber types has advantages with respect to the manner in which it is mounted, each type is also limited to specific mounting arrangements which may not satisfy all of the mounting requirements of a given user and which may therefore require that a large inventory of parts be carried by the manufacturer, distributor, or user in order to satisfy all of the possible mounting requirements of the user.

It has also become increasingly popular to provide some manner of stop device as an integral part of the shock absorber to ensure that the component being stopped ends up at the same point with each decelerating action, to ensure that the shock absorber does not bottom out internally at the end of the decelerating movement and to precisely position the piston of the shock absorber as it nears the end of its stroke to optimize the fluid flow through the metering orifices to achieve a desired performance characteristic. In this regard, each of the described types of shock absorbers is amenable to the use of an integral stop member in certain mounting situations but requires a complex stop member arrangement in other mounting installations.

SUMMARY OF THE INVENTION

The present invention is directed to the provision of a shock absorber which provides extreme versatility with respect to the manner in which the shock absorber may be mounted.

This invention is further directed to the provision of a shock absorber which, in addition to offering a wide variety of mounting arrangements, allows the ready provision of a stop member as an integral part of the shock absorber in each of the various mounting arrangements.

The invention shock absorber is of the type including a housing defining a bore and an internal subassembly for receipt in the bore of the housing and including a piston, a piston rod, and a pad on the free end of the piston rod presenting an impact surface for contact by the object to be decelerated. According to the invention, the housing includes a central main body portion, a reduced diameter threaded forward portion forming an annular forward shoulder with the main body portion, and a rear flange portion rigidly secured to the main body portion and extending radially outwardly from the main body portion. This housing arrangement allows the shock absorber to be conveniently rear mounted by the use of the rear flange and to be conveniently front mounted by the use of the reduced diameter threaded forward end portion.

According to a further feature of the invention, the rear flange portion defines a flat rear face defining the extreme rear face of the shock absorber. This arrangement allows the shock absorber to be rear mounted with the flange positioned flush against a suitable mounting surface.

According to a further feature of the invention, the rear flange is rectangular and the central main body portion is cylindrical. This arrangement allows mounting holes to be provided in the corners of the rectangular rear flange to facilitate the mounting process.

According to a further feature of the invention, the rear flange includes a central circular aperture and is fitted over the rear end of the central main body portion with the rear face of the flange flush with the rear face of the main body portion. This arrangement provides a convenient and positive arrangement for mounting the flange on the rear end of the shock absorber and provides a smooth flush rear mounting face for the shock absorber.

According to a further feature of the invention, the main body portion is stepped proximate its rear end to define a reduced diameter portion and an annular rear shoulder, and the flange is positioned on the reduced diameter portion in abutting relation with the rear shoulder. This arrangement provides a convenient, self-centering and positive mounting of the flange on the main body portion while retaining the smooth flush configuration of the rear face of the shock absorber.

According to a further feature of the invention, the shock absorber includes mounting means operative to install the internal subassembly in the bore in a first position in which the piston rod extends out of the forward end of the housing and in a second position in which the piston rod extends out of the rearward end of the housing. This arrangement, whereby the internal subassembly may be mounted within the bore of the housing in either of two mutually reversed positions, provides further versatility with respect to the ways in which the shock absorber may be configured and mounted to suit various applications of the user.

According to a further feature of the invention, the mounting means comprises internal grooves in the bore of the housing proximate each end of the housing, retaining rings for mounting in the grooves, and means on the internal subassembly defining spaced annular surfaces for respective abutting coaction with the retaining rings. This simple arrangement allows the internal subassembly to be readily reversed within the bore of the housing to suit the mounting needs of the particular application.

According to a further feature of the invention, the shock absorber further includes stop means adapted to be secured to one end of the housing and to present a stop surface spaced axially outwardly from the one housing end and spaced axially inwardly from the impact surface on the pad, with the shock absorber in its extended rest position, by a distance corresponding generally to the stroke of the shock absorber less the desired clearance at the bottomed position of the shock absorber. This arrangement allows the shock absorber to be provided with stop means to provide the desired work positioning and anti-bottoming stop functions.

According to a further feature of the invention, the stop means comprises an internally threaded collar adapted to be screwed onto the reduced diameter threaded forward portion of the housing to readily provide the desired stop means.

According to a further feature of the invention, the stop means comprises stop bars adapted to be positioned at their forward ends against the rear face of the flange and extend rearwardly therefrom to present the stop surface at their free rear ends.

BRIEF DESCRIPTION OF THE DRAWINGS

FIG. 1 is a cross-sectional view of the invention shock absorber;

FIG. 2 is a fragmentary cross-sectional view of the housing of the invention shock absorber;

FIGS. 3 and 4 are respective end views of the housing of FIG. 2; and

FIGS. 5, 6, 7, 8, 9, 10, 11, and 12 show various ways in which the invention shock absorber may be mounted.

DETAILED DESCRIPTION OF THE PREFERRED EMBODIMENT

The invention shock absorber, broadly considered, includes a housing structure 10, an internal subassembly 12, and an adjuster mechanism 14.

Housing structure 10 includes a main housing member 16 and a flange 18. Main housing member 16 is generally cylindrical and defines a continuous cylindrical through bore 19 extending from the front end to the rear end thereof. Housing member 16 includes a main body cylindrical portion 16a, a reduced diameter threaded forward portion 16b forming an annular shoulder 16c with main body portion 16a, and a reduced diameter rear end 16d forming a shoulder 16e with main body portion 16a. Housing member 16 is formed of a suitable ferrous material.

Flange 18 is formed of a suitable ferrous material, has a generally square configuration, and includes a circular central aperture 18a. Flange 18 has a thickness generally corresponding to the axial length of reduced diameter portion 16d of housing member 16 and is mounted on reduced diameter portion 16d in abutting engagement with shoulder 16e. Flange 18 is rigidly secured to housing member 16 by a copper brazing process and, in its mounted position on housing 16, presents an annular rear face 18c that is flush with the annular rear end 16f of housing member 16.

Internal subassembly 12 includes an inner tube member 20, a bearing assembly 22, a metering tube 24, and a piston assembly 26.

Inner tube member 20 is ferrous and includes a generally cylindrical end wall portion 20a, a flange portion 20b defining an external seal groove 20c, and a central inner tube portion 20d extending forwardly from rear wall portion 20a and including a plurality of exponentially spaced metering orifice 20e and a replenishing port 20f.

Bearing assembly 22 includes a ferrous annular bearing member 28, a seal 30, and a wiper 32. Bearing member 28 includes a central flange portion 28a defining an external seal groove 28b, a forward tubular portion 28c defining a seal counterbore 28d, and a rearward tubular portion 28e including a stepped down rearward portion 28f forming a shoulder 28g with the main body of the rearward tubular portion 28e. Seal 30 and wiper 32 are annular and are sized to fit within seal counterbore 28d.

Metering sleeve 24 is ferrous and is sized to slidably surround the outer diameter of the inner tube portion 20d of member 20 and includes a plurality of circular grooves 24a of arcuate cross section formed on the internal periphery of the sleeve spaced at exponentially decreasing distances in the direction of the rear of the sleeve and generally corresponding to and respectively coacting with the metering holes 20e in sleeve 20d. A metering hole 24b is formed in metering sleeve 24 in association with each groove 24a. Sleeve 24 further includes a relatively large diameter circular hole 24c adjacent its forward end.

Piston assembly 26 includes a piston rod 34, including an integral head 34a formed at the rearward end of the piston rod, and a button or impact pad 36 secured to the forward end of piston rod 34 by a screw 38 threaded into a hole in the forward end of the piston rod. Piston head 34a is formed with a rearwardly opening central aperture 34b which communicates at its forward end with a central axial bore 34c which in turn communicates with a cross bore 34d. The concave surface between the aperture 34b and bore 34c acts as a seat for a ball check valve 40.

In the assembled relation of the internal subassembly 12, the rear end of inner tube portion 20d of member 20 fits telescopically over the rear end 28f of bearing member 28 with its forward annular edge in abutting engagement with shoulder 28g; piston head 34a is slidably received in the internal bore of sleeve portion 20d of member 20; piston rod 34 is slidably received in the internal bore 28h of bearing member 28; seal 30 and wiper 32 sealingly and slidably engage piston rod 34; and metering sleeve 24 is slidably disposed on the outer periphery of inner tube 20d with its metering grooves and metering holes in general alignment with the metering holes in the inner tube.

Internal subassembly 12 is positioned within bore 18 of the housing structure by a pair of retaining rings 42 respectively positioned in internal grooves 16g provided in the housing bore 18 proximate the forward and rearward ends of the bore. The rings 42 respectively coact with an annular surface 20g defined by member 20 between end wall 20a and flange 20b and with a further annular surface 28i defined on bearing member 28 between flange portion 28a and forward tubular portion 28c. The internal subassembly may be positioned as seen in FIG. 1 with piston rod 26 extending out of the forward end of the housing or, alternatively, and as seen in FIGS. 9–12, may be positioned with its piston rod 26 extending out of the rearward end of the housing. A reversal of the internal subassembly within the bore 19 is accomplished simply by removing the retaining rings 42, removing the internal subassembly from the bore 19, reinstalling the internal subassembly in a reversed position in the bore, and thereafter reinstalling the retaining rings 42.

Adjuster mechanism 14 includes a tubular member 44 positioned in a bore 16g in housing main body portion 16a with a rim portion 44a of the sleeve positioned in a counterbore 16h in main body housing portion 16a. Sleeve 44 is brazed to housing 16. Adjuster mechanism 14 further includes an adjuster member 46 mounted for rotation in sleeve 44. Member 46 includes a main body cylindrical portion 46a received in sleeve 44, a flange portion 46b defining a central socket 46c, and an eccentric pin portion 46d. In the assembled relation the shock absorber, eccentric pin portion 46d is received in the enlarged aperture 24c in the forward end of metering sleeve 24 so that rotation of adjuster member 46, by the use of a suitable tool or coin inserted in socket 46c, moves metering sleeve 24 in an orbital manner with respect to inner tube 20d so as to selectively adjust the relative position of the grooves 24a with respect to metering holes 20e and selectively vary the performance characteristics of the shock absorber, in a manner more fully explained in U.S. Pat. No. 4,482,035 assigned to the assignee of the present invention.

A coil spring 48 is positioned between the forward retaining ring 42 and an annular surface 36a on the pad 36 to normally maintain the shock absorber in the extended or rest position of FIG. 1 wherein the rear end of piston head 34b is maintained in abutting engagement with the rearward annular edge of bearing member rearward portion 28f.

The described housing construction, with its reduced diameter threaded forward portion and its rearward flange portion, in coaction with the mounting means whereby the internal subassembly may be readily reversed within the bore of the housing, allows the invention shock absorber to provide extreme versatility with respect to the manner in which the shock absorber may be mounted and with respect to the manner in which the shock absorber may coact with suitable stop elements to provide an integral stop for the shock absorber in any and all mounting environments.

The various mounting arrangements made possible by the invention shock absorber are illustrated in FIGS. 5–12.

In the mounting arrangement seen in FIGS. 5 and 6, the internal subassembly is positioned with the piston rod projecting out of the forward end of the shock absorber and the shock absorber is rear mounted by the use of suitable fasteners 48 passing through flange apertures 18b for threaded engagement with suitable tapped bores in a suitable mounting member 50. In this mounting arrangement, a stop member may be readily and conveniently provided by the use of an internally threaded collar 52 threaded onto reduced diameter threaded forward portion 16b into abutting engagement with forward shoulder 16c and sized so that the stop surface presented by the forward annular edge 52a of the collar, with the shock absorber in its rest or extended position, is spaced axially rearwardly from the forward impact surface 36b of impact pad 36 by a distance corresponding generally to the stroke of the shock absorber less the desired clearance at the bottomed position of the shock absorber between the rear face of the piston head 34a and the annular shoulder 20h defined by end wall portion 20a of member 20. That is, if it is desired to maintain a 1/16th inch bottomed clearance between the piston head 34a and the annular shoulder 20h and the stroke of the shock absorber is 3 inches, the distance between stop surface 52a provided by stop collar 52 and the impact surface 36b of the impact pad 36 would be 2 15/16 inches so that, at the conclusion of its 3 inch stroke following impact by a moving object, the rearward 20 end of the piston head 34b would be positioned 1/16 of an inch from the annular shoulder 20h.

In the mounting arrangement seen in FIGS. 7 and 8, the shock absorber is front mounted by the use of a mounting plate 54 having a central aperture 54a sized to pass the reduced diameter forward end portion 16b of the shock absorber housing with an annular stop collar 56 threaded onto reduced diameter portion 16b and into abutting engagement with mounting plate 54 so as to clamp the plate between shoulder 16c and the rear annular edge 56a of the stop collar, whereby to provide a positive mounting for the shock absorber and simultaneously, by appropriate sizing of stop collar 56, provide an annular stop surface 56b at the forward end of the stop collar spaced rearwardly from the impact surface 38d of the impact pad by a distance equal to the stroke of the shock absorber less the desired clearance between the piston head 34a and shoulder 20h in the fully contracted position of the shock absorber.

In the mounting arrangement of FIGS. 9 and 10, the internal subassembly 12 has been reversed with respect to its position in the FIGS. 5 and 6 and FIGS. 7 and 8 mounting arrangements, such that the piston rod 34 now extends out of the rear end of the housing, and the shock absorber is rear mounted by passing the shock absorber body 16 through an aperture 60a in a mounting plate 60 to bring the forward face of flange 18 into abutting engagement with plate 60 around aperture 60a and by passing suitable fasteners 58 through suitable apertures in mounting plate 60 and through mounting holes 18b in the mounting flange 18 for threaded engagement with threaded bores in stop bars 62 positioned respectively above and below the piston rod 34. Stop bars 62 are thus positioned at their forward ends against the rear face of flange 18 and present stop surfaces 62a at their free rear ends spaced forwardly from the impact surface 36b of the impact pad by a distance corresponding to the stroke of the shock absorber less the desired clearance between the piston head 34a and annular shoulder 20h in the fully retracted position of the shock absorber.

In the mounting arrangement seen in FIGS. 11 and 12, the internal subassembly is positioned with the piston rod 34 extending out of the rear end of the housing, the shock absorber is front mounted by threading reduced diameter front end portion 16b into a threaded hole in a mounting plate 64 to move shoulder 16c into abutting engagement with the rearward face of plate 64, and stop bars 66 are provided projecting rearwardly from the rear face of flange 18. Stop bars 66 are secured to the rear face of flange 18 by fasteners 68 passing through the mounting holes 18b of flange 18 for threaded engagement with threaded bores in the stop bars and the stop bars are sized such that they present a stop surface 66a spaced forwardly from the impact surface 36b of the impact pad by a distance equal to the stroke of the shock absorber plus the desired clearance in the fully retracted position of the shock absorber between piston head 34a and the annular shoulder 20h.

It will be seen that in each of the disclosed mounting arrangements, the shock absorber is firmly and positively mounted to the adjacent mounting structure in a manner such that the shock absorber will not move relative to the mounting structure even over extended periods of usage; the position of the shock absorber relative to the mounting surface is readily and precisely reproducible so that the shock absorber may be replaced with another shock absorber without fear of upsetting the delicate positioning of the shock absorber relative to the moving object; and each of the mounting arrangements can readily be provided with a stop member to provide a precise stop position for the impacting object so as to provide accurate work positioning for the component being stopped and so as to assure that the shock absorber will not bottom out internally.

Whereas a preferred embodiment of the invention has been illustrated and described in detail, it will be apparent that various changes may be made in the disclosed embodiment without departing from the scope or spirit of the invention.

We claim:

1. A shock absorber comprising:
   an internal subassembly including a piston, a piston rod, and a pad on the free end of said piston rod presenting an impact surface;
   a housing defining a bore for receipt of said internal subassembly and including a central main body portion, a reduced diameter threaded forward portion forming an annular forward shoulder with said main body portion and providing front mounting means for said shock absorber, and a rear flange portion rigidly and immovably secured to the rear end of said main body portion and extending radially outwardly from said main body portion to provide rear mounting means for said shock absorber, said internal subassembly being installed in said bore with said piston rod extending out of the forward end of said housing; and
   an internally threaded stop collar adapted to be screwed onto said reduced diameter threaded forward portion of said housing and presenting a stop surface spaced axially outwardly from the forward end of said reduced diameter threaded forward portion and spaced axially inwardly from said impact surface on said pad with the shock absorber in its extended rest position by a distance corresponding generally to the stroke of the shock absorber less the desired clearance at the bottomed position of the shock absorber.

2. A shock absorber comprising:
   an internal subassembly including a piston, a piston rod, and a pad on the free end of said piston rod presenting an impact surface;
   a housing defining a bore for receipt of said internal subassembly and including a central main body portion, a reduced diameter threaded forward portion forming an annular forward shoulder with said main body portion and providing front mounting means for said shock absorber, and a rear flange portion rigidly and immovably secured to the rear end of said main body portion and extending radially outwardly from said main body portion to provide rear mounting means for said shock absorber, said internal subassembly being installed in said bore with said piston rod extending out of the rearward end of said housing; and
   stop bars adapted to be positioned at their forward ends against the rear face of said flange and extend rearwardly therefrom to present a stop surface at their free rearward ends spaced axially outwardly from the rear face of said flange and spaced axially inwardly from said impact surface on said pad with the shock absorber in its extended rest position by a distance corresponding generally to the stroke of the shock absorber less the desired clearance at the bottomed position of the shock absorber.

3. A shock absorber comprising:
   an internal subassembly including a piston, a piston rod, and a pad on the free end of said piston rod presenting an impact surface;
   a housing defining a bore for receipt of said internal subassembly and including a central main body portion, a reduced diameter threaded forward portion forming an annular forward shoulder with said main body portion and providing a front mounting means for said shock absorber, and a rear flange portion rigidly and inwardly secured to the rear end of said main body portion and extending radially outwardly from said main body portion to provide rear mounting means for said shock absorber;
   mounting means operative to install said internal subassembly in said bore in a first position in which said piston rod extends out of the forward end of said housing and a second position in which said piston rod extends out of the rearward end of said housing;
   stop means adapted to be secured to the respective end of said housing from which said piston rod extends and to present a stop surface spaced axially outwardly from said respective housing end and spaced axially inwardly from said impact surface on said pad with the shock absorber in its extended rest position by a distance corresponding generally to the stroke of the shock absorber less the desired clearance at the bottomed position of the shock absorber;
   said internal subassembly being installed in said bore with said piston rod extending out of the forward end of said housing and said stop means comprising an internally threaded collar adapted to be screwed onto said reduced diameter forward portion of said housing.

4. A shock absorber comprising:
   an internal subassembly including a piston, a piston rod, and a pad on the free end of said piston rod presenting an impact surface;
   a housing defining a bore for receipt of said internal subassembly and including a central main body portion, a reduced diameter threaded forward portion forming an annular forward shoulder with said main body portion and providing a front mounting means for said shock absorber, and a rear flange portion rigidly and inwardly secured to the rear end of said main body portion and extending radially outwardly from said main body portion to provide rear mounting means for said shock absorber;

mounting means operative to install said internal subassembly in said bore in a first position in which said piston rod extends out of the forward end of said housing and a second position in which said piston rod extends out of the rearward end of said housing;

stop means adapted to be secured to the respective end of said housing from which said piston rod extends and to present a stop surface spaced axially outwardly from said respective housing end and spaced axially inwardly form said impact surface on said pad with the shock absorber in its extended rest position by a distance corresponding generally to the stroke of the shock absorber less the desired clearance at the bottomed position of the shock absorber;

said internal subassembly being installed in said bore with said piston rod extending out of the rearward end of said housing and said stop means comprising stop bars adapted to be positioned at their forward ends against the rear face of said flange and extend rearwardly therefrom to present said stop surface at their free rearward ends.

* * * * *